United States Patent [19]
Ohta et al.

[11] Patent Number: 5,293,359
[45] Date of Patent: Mar. 8, 1994

[54] MAGNETIC RECORDING AND REPRODUCING APPARATUS HAVING A FERRIMAGNETIC RECORDING MEDIUM, A MAGNETIC HEAD AND FIRST AND SECOND LIGHT SOURCES

[75] Inventors: Kenji Ohta, Kitakatsuragi; Akira Takahashi, Nara; Junsaku Nakajima, Yamatotakada; Yoshiteru Murakami, Nishinomiya; Junji Hirokane, Nara, all of Japan

[73] Assignee: Sharp Kabushiki Kaisha, Osaka, Japan

[21] Appl. No.: 741,932

[22] Filed: Aug. 8, 1991

[30] Foreign Application Priority Data

Aug. 10, 1990 [JP] Japan .................... 2-212619

[51] Int. Cl.⁵ .............................. G11B 13/04
[52] U.S. Cl. ........................ 369/13; 360/114
[58] Field of Search ............... 369/13, 14; 360/59, 360/66, 114, 105

[56] References Cited

U.S. PATENT DOCUMENTS

| | | | |
|---|---|---|---|
| 4,985,881 | 1/1991 | Saito et al. | 369/13 |
| 5,051,970 | 9/1991 | Ishii et al. | 369/13 |
| 5,107,471 | 4/1992 | Miyake et al. | 369/13 |
| 5,202,862 | 4/1993 | Ohta et al. | 369/13 |
| 5,237,548 | 8/1993 | Muchnik | 369/13 |

FOREIGN PATENT DOCUMENTS

| | | |
|---|---|---|
| 0327315 | 8/1989 | European Pat. Off. . |
| 0352099 | 1/1990 | European Pat. Off. . |
| 0383386 | 8/1990 | European Pat. Off. . |
| 4024033 | 2/1991 | Fed. Rep. of Germany . |
| 61-78060 | 12/1986 | Japan . |
| 1-151002 | 6/1989 | Japan .................... 369/13 |

OTHER PUBLICATIONS

Nomura, et al., "Proposed Magneto-Optic Video Recording Systems Using Thermoremanent Techniques" NHK Technical Research Laboratories, 1979, Institute of Electronics and Communication Engineers of Japan, Technical Research Report MR 79-3 (with partial English translation).

Primary Examiner—Hoa T. Nguyen
Attorney, Agent, or Firm—David G. Conlin; George W. Neuner

[57] ABSTRACT

A magnetic recording and reproducing apparatus using a recording medium made of a ferrimagnetic material, comprises a magnetic head for magnetically recording information on a recording area of a selected information recording track on a recording medium having a plurality of tracks and for magnetically reproducing the information from the recording medium, the magnetic head has a width larger than that of the width of the selected information recording track of the recording medium. For recording, light beams are radiated from a first light source on the recording area of the selected information recording track upon which recording is to be performed tracks to raise the temperature of the irradiated area to approximately a Curie temperature so as to allow recording only on that area. For reproduction, light beams are radiated from another light source onto areas on both sides of on a second area of the recording medium, located on both sides of the selected information recording track, to raise the temperature of the second irradiated areas to approximately a magnetic compensation temperature so as to allow reproduction only from the desired track, thus preventing crosstalk from the side tracks.

4 Claims, 3 Drawing Sheets

MAGNETIC RECORDING AND REPRODUCING APPARATUS HAVING A FERRIMAGNETIC RECORDING MEDIUM, A MAGNETIC HEAD AND FIRST AND SECOND LIGHT SOURCES

BACKGROUND OF THE INVENTION

1. Field of the Invention

The present invention relates to a magnetic recording and reproducing apparatus, and more particularly, to an apparatus which magnetically records and reproduces information on and from a recording medium by radiating light beams onto the recording medium to raise the temperature thereof.

2. Description of the Prior Art

In recent years, in the field of optical memory devices, rewritable memories have been developed, besides the read only memories such as compact disks. Among such rewritable memories, a magneto-optic disk has already been put in practical use. The magneto-optic disk employs a vertical magnetization film, such as a rare-earth transition alloy thin film, as a recording medium. For recording, as laser beams are being radiated onto the recording medium, an external magnetic field is applied to the irradiated recording medium. For reproduction, the Kerr effect is utilized in which, when laser beams are radiated onto the recording medium, the plane of polarization of the reflecting beams rotates in different directions depending on the existence of data on the recording medium.

A recording and reproducing method which employs a ferromagnet such as $CrO_2$ for a recording medium has been proposed. (See Nomura, Yokoyama, "Proposed Magneto-Optic Video Recording Systems Using Thermoremanent Techniques, NHK Technical Research Laboratories, 1979, Institute of Electronics and Communication Engineers of Japan Technical Research Report MR79-3.) In this method, recording is performed by applying an external magnetic field to the recording medium of which coercive force has been reduced by radiating laser beams thereto, by means of a magnetic head for recording, as is done in the case of the above magneto-optic disk, and reproduction is magnetically performed by using a magnetic head for reproduction.

However, in the above optically assisted magnetic recording and reproducing method, it is difficult to have a magnetic head for reproduction that has a sufficiently small width to meet the width of a track of the recording medium. This results in reproducing unnecessary signals on the tracks on both sides of a track from which reproduction is intended, thereby causing the problem of crosstalk.

Such crosstalk may be prevented if the track width is made larger than the width of the magnetic head for reproduction. In this case, however, the track width must be significantly large, and thus the recording density disadvantageously decreases.

SUMMARY OF THE INVENTION

The magnetic recording and reproducing apparatus of this invention, which overcomes the above-discussed and numerous other disadvantages and deficiencies of the prior art, comprises, in the use of a recording medium made of a ferrimagnet, a magnetic head adapted to record on and reproduce from a selected track of the recording medium, the magnetic head having a width larger than the track width of the recording medium, a first light source for recording which radiates light beams along one of the tracks of the recording medium on which recording is to be performed so as to raise the temperature of the irradiated area to approximately a Curie temperature, and a second light source for reproduction which radiates light beams onto areas of the recording medium which are located on both sides of a track selected to effect reproduction and which face the magnetic head so as to raise the temperature of the irradiated areas to approximately a magnetic compensation temperature.

Alternatively, the magnetic recording and reproducing apparatus using a recording medium made of a ferrimagnet comprises a first magnetic head for recording and a second magnetic head for reproduction, the magnetic heads being adapted to record on and reproduce from a selected track of the recording medium, respectively, each magnetic head having a width larger than the track width of the recording medium, a first light source for recording which radiates light beams along one of the tracks of the recording medium on which recording is to be performed so as to raise the temperature of the irradiated area to approximately a Curie temperature, and a second light source for reproduction which radiates light beams onto areas of the recording medium which are located on both sides of a track selected to effect reproduction and which face the magnetic head so as to raise the temperature of the irradiated areas to approximately a magnetic compensation temperature.

In a preferred embodiment, the second light source includes two discrete light sources to radiate light beams onto two respective side areas.

In a preferred embodiment, the first and second light sources are lasers.

In the structure of the apparatus of this invention, the ferrimagnet is employed for the recording medium instead of a ferromagnet which has been conventionally used in the optically assisted magnetic recording and reproducing method. The recording medium made of the ferrimagnet provides a magnetic compensation temperature and a Curie temperature. At the magnetic compensation temperature, the remnant magnetization of the recording medium becomes substantially zero, while the coercive force thereof becomes infinite. At the Curie temperature, both the remnant magnetization and the coercive force thereof become substantially zero.

Accordingly, in the present invention, at recording, the temperature of the area of the recording medium irradiated with light beams is raised to approximately the Curie temperature so as to obtain substantially zero coercive force which enables an external magnetic field to be applied to the irradiated area of the recording medium, thereby allowing information to be recorded on the recording medium. The width of the track on which recording is to be performed depends on the spot diameter of the light beams. Therefore, the recording can be performed within a given track width if the magnetic head for recording has a width (in the direction across the tracks of the recording medium) larger than the track width.

At reproducing, the temperature of the areas of the recording medium which are irradiated with light beams and located on both sides of the track from which reproduction is to be performed and facing the magnetic head for reproduction is raised to approximately the magnetic compensation temperature, so as to obtain substantially zero magnetization, and thereby to allow only the information on the desired track to be reproduced if the width of the magnetic head is larger than the track width.

Thus, the present invention makes possible the objective of providing a magnetic recording and reproducing apparatus having a magnetic head of a width larger than the track width without causing the problem of crosstalk. This eliminates the necessity of minimizing the width of the magnetic head in order to meet the track width, and also enables minimizing the track width independently from the width of the magnetic head. Thus, easy manufacture of the magnetic head and higher recording density of the recording medium are possible.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

One embodiment of the present invention is described with reference to the drawings as follows.

Figure 3:
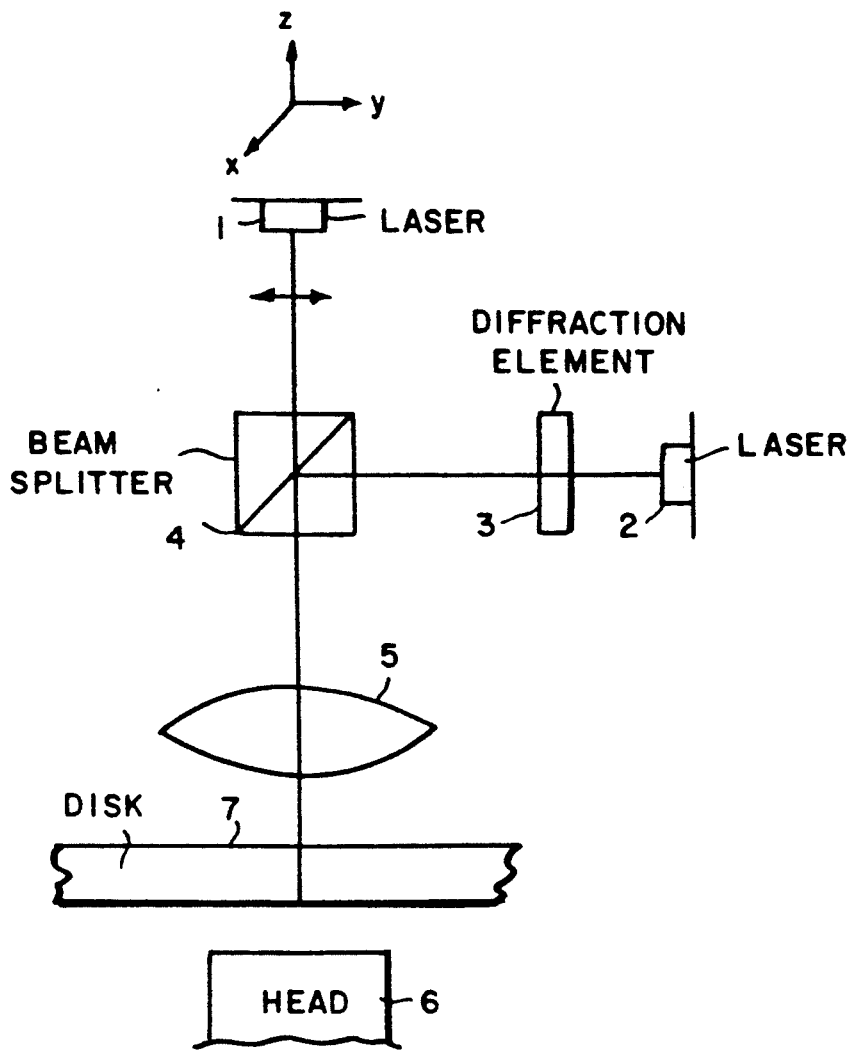
FIG. 3 is an overall structural view of the magnetic recording and reproducing apparatus of FIG. 1(a)

As shown in FIG. 3, the magnetic recording and reproducing apparatus comprises a laser 1 for recording which emits laser beams oscillating on the y-z plane, a laser 2 for reproduction which emits laser beams oscillating on the x-y plane, a diffraction element 3, a polarization beam splitter 4, an objective lens 5 (numerical aperture: about 0.4 to 0.6, for example), and a magnetic head 6 for both recording and reproducing. The laser 1 for recording, the polarization beam splitter 4, the objective lens 5, and the magnetic head 6 are arranged on an identical optical axis, while the laser 2 for reproduction, the diffraction element 3, and the polarization beam splitter 4 are arranged on another identical optical axis which is perpendicular to the former optical axis. For the laser 1 for recording and the laser 2 for reproduction, a semiconductor laser having a wavelength of 780 nm can be used.

Figure 1A:
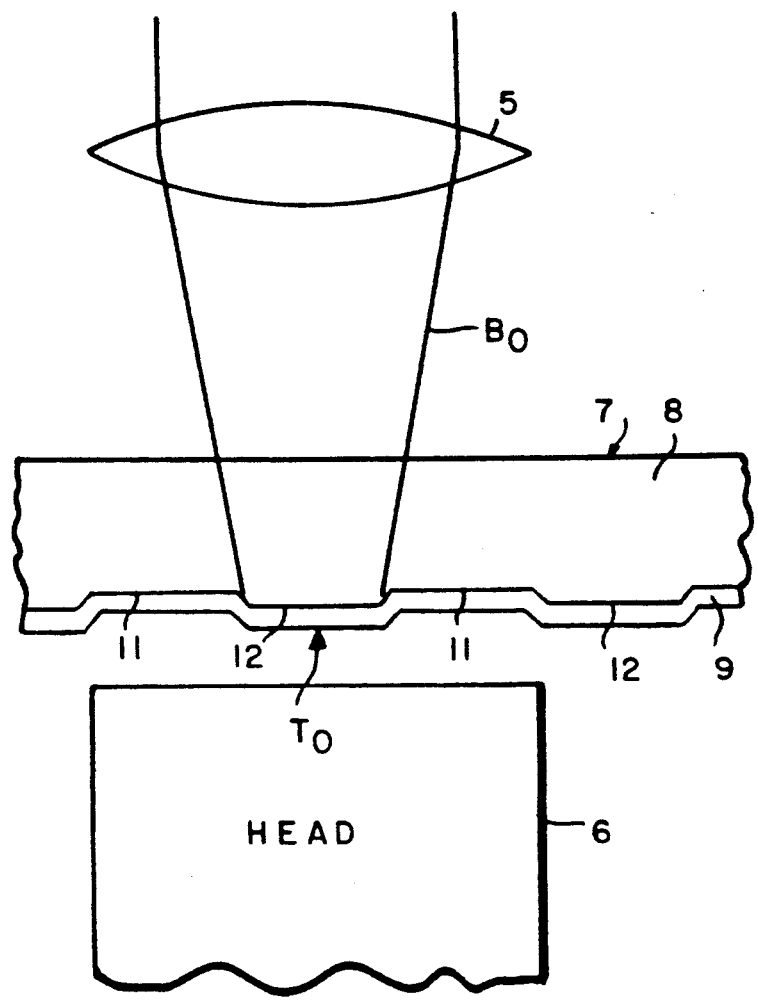
FIG. 1(a) is an explanatory diagram of a major part of a magnetic recording and reproducing apparatus according to the invention to show the recording operation of the apparatus.

As further shown in FIG. 1(a), an optically assisted magnetic disk 7 is interposed between the objective lens 5 and the magnetic head 6. The magnetic disk 7 comprises a light-transparent substrate 8 and a recording medium 9 formed thereon. The substrate 8 is made of glass, polycarbonate, polymethyl methacrylate, amorphous polyolefin, or the like. On one surface of the substrate 8, grooves 11 and lands 12 are alternately formed. In this embodiment, as further shown in FIG. 2, recording is performed on the grooves 11 and the lands 12 of the recording medium, and thereby bits 13 are formed thereon. The track width w, that is, the width of the grooves 11 or the lands 12 is set to about 1 μm. A protective layer (not shown) may be formed on the recording medium 9, if required.

Figure 1B:
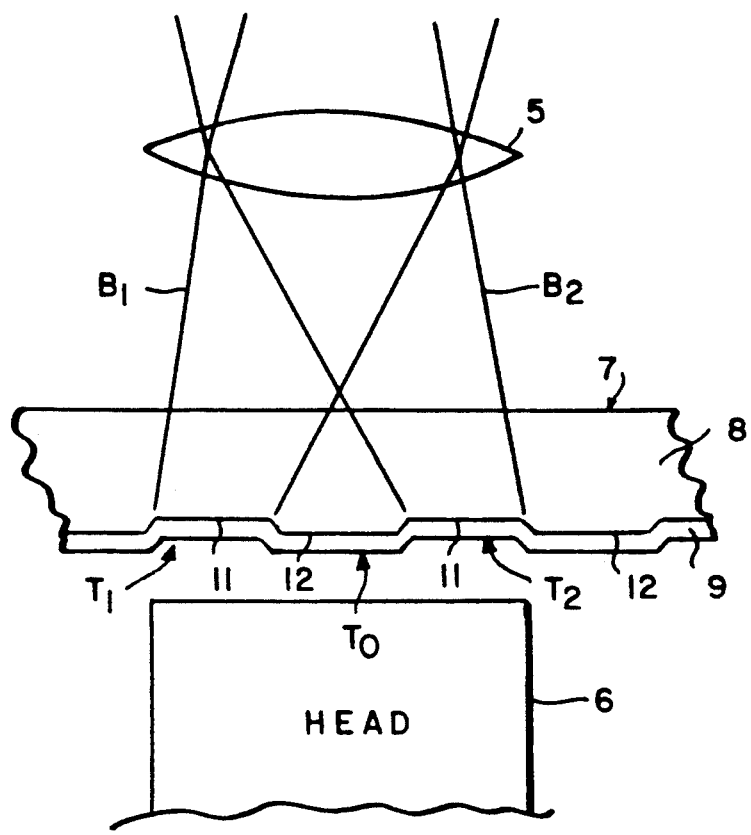
FIG. 1(b) is an explanatory diagram of the major part of the magnetic recording and reproducing apparatus of FIG. 1(a) to show the reproducing operation of the apparatus.

The magnetic head 6 (not concretely shown) extends in the horizontal direction as viewed in FIG. 1(a) As in apparent in the figure, the width of the magnetic head is set to three times the track width, i.e. 3 μm. The laser beams emitted from the laser 1 for recording are converged as laser beams $B_0$ through the objective lens 5 on a track $T_0$ of the recording medium 9 on which recording is to be performed. Meanwhile, as shown in FIG. 1(b), the laser beams emitted from the laser 2 for reproduction are divided by the diffraction element 3 into two sets of the first degree diffraction light beams while weakening the zero degree diffraction light beams. The diffracted light beams are converged as laser beams $B_1$ and $B_2$ through the objective lens 5 on tracks $T_1$ and $T_2$ on both sides of the track $T_0$ from which reproduction is to be performed, respectively. The laser 1 for recording is set to have a power strong enough to raise the temperature of the track $T_0$ to approximately a Curie temperature $T_c$, while the laser 2 for reproduction is set to have a power strong enough to raise the temperature of the tracks $T_1$ and $T_2$ to approximately a magnetic compensation temperature $T_{comp}$.

Figure 4:
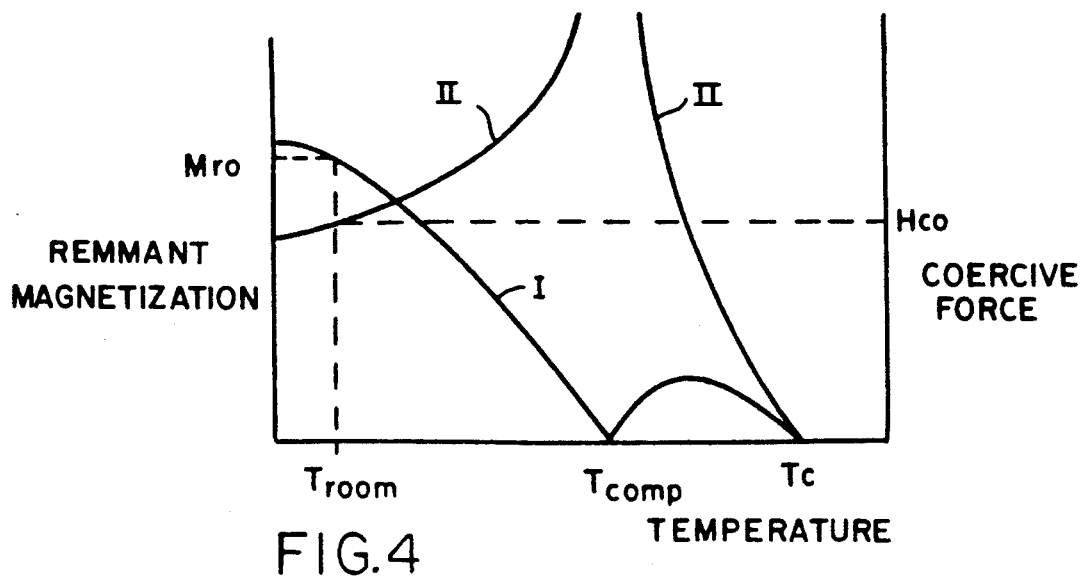
FIG. 4 is a graph showing the relationship of the remnant magnetization and the coercive force with the temperature, respectively.

Referring to FIG. 4 illustrating the remnant magnetization as the curve I and the coercive force as the curve II, a preferred material for the recording medium 9, which is made of a ferrimagnet, has a remnant magnetization of more than 200 emu/cc and a coercive force of more than 500 Oe at room temperature (about 25° C.). Also, such a material preferably has a magnetic compensation temperature $T_{comp}$ of about 150° C. at which the remnant magnetization becomes substantially zero and the coercive force becomes infinite, and a Curie temperature $T_c$ of more than 200° C. at which the remnant magnetization and the coercive force become substantially zero.

In the above structure, recording is performed along the grooves 11 and the lands 12. That is, each of the grooves 11 and the lands 12 constitutes a track. Referring to FIG. 1(a), when recording is performed on the track $T_0$ constituted by the land 12, the laser beams $B_0$ emitted from the laser 1 for recording is converged on the track $T_0$ through the objective lens 5 so as to raise the temperature of the area along the track $T_0$ of the recording medium 9 to approximately the Curie temperature $T_c$, hence attaining substantially zero coercive force. Under this condition, an upward or downward magnetic field as viewed in the figure is applied to the area by means of the magnetic head 6, thereby to record desired information.

Figure 2:
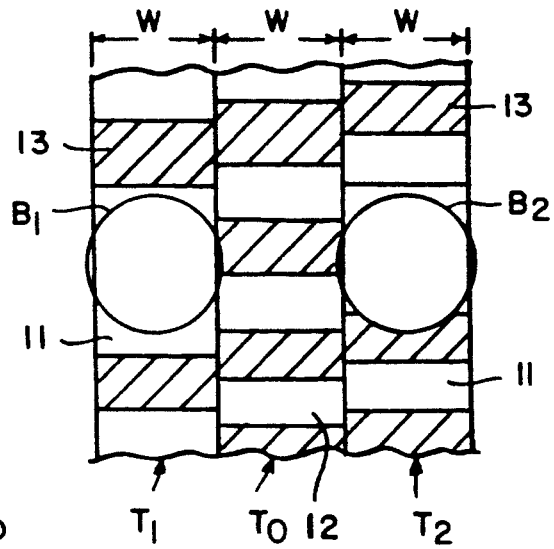
FIG. 2 is a schematic front elevation of a recording medium used in the magnetic recording and reproducing apparatus of FIG. 1(a)

At reproduction, as shown in FIGS. 1(b) and 2, laser beams emitted from the laser 2 for reproduction are divided by the diffraction element 3 into two sets of the first degree diffraction light beams, weakening the zero degree diffraction light beams. The diffracted laser beams are reoriented as the laser beams $B_1$ and $B_2$ through the objective lens 5 to irradiate the tracks $T_1$ and $T_2$ on both sides of the track $T_0$ from which reproduction is to be performed, respectively. In this way, the temperature of the irradiated areas on the tracks $T_1$ and $T_2$ is raised to approximately the magnetic compensation temperature $T_{comp}$, and thereby substantially zero remnant magnetization is attained. At this time, on the contrary, the area along the track $T_0$ of the recording medium 9, which is kept at room temperture, has a sufficiently strong remnant magnetization, allowing the reproduction of information from the track $T_0$ without being interfered with by crosstalk from the tracks $T_1$ and $T_2$.

In the above example, the recording was performed both on the grooves 11 and on the lands 12 of the recording medium, but either of the grooves 11 or the lands 12 may be used for recording. In this case, as in the above example, the areas on both sides of a track from which reproduction is to be performed and facing the magnetic head 6 may be irradiated with laser beams, so as to prevent crosstalk from these areas.

Also, in the above example, the laser beams emitted from the laser 2 for reproduction were divided into two sets of the first degree diffraction light beams by the diffraction element 3. Alternatively, it is also possible to utilize two lasers for reproduction so that two side areas can be irradiated with laser beams emitted from the respective discrete lasers for reproduction.

Further, in the above example, a single magnetic head 6 was used for both recording and reproduction for simplified description of the example. Alternatively, two magnetic heads can be provided for recording and for reproduction, respectively. Furthermore, a main pole type magnetic head may be used instead of the gap type of this example. (See Iwasaki, Nakakura, Watanabe, "Recording Properties of a Single Pole Magnetic Head", Tohoku Univ. Telecommunications Research Center, MR76-16.) In this case, the width of the main pole should be the width of the magnetic head. It is also possible to use a magnetic head employing a magneto-resistance effect element, instead of the coil as in this example.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A magnetic recording and reproducing apparatus comprising:
    an optically assisted magnetic disk, the magnetic disk comprising a light-transparent substrate and a recording medium;
    an objective lens;
    recording tracks formed on the recording medium;
    a magnetic head for magnetically recording information on the recording tracks and for magnetically reproducing the information from the recording tracks, the magnetic head having a width larger than the width of the recording tracks;
    a first light beam for recording; and
    a second light beam for reproducing,
    wherein the recording medium is made of a ferrimagnetic material;
    the magnetic disk is interposed between the objective lens and the magnetic head;
    the first light beam is converged through the objective lens on the recording track;
    the second light beam is converged through the objective lens on the tracks on both sides of the recording track;
    the first light beam is set to have a power strong enough to raise the temperature of the recording track to approximately a Curie temperature; and
    the second light beam is set to have a power strong enough to raise the temperature of the tracks on both sides of the recording track to approximately a magnetic compensation temperature.

2. A magnetic recording and reproducing apparatus according to claim 1, wherein the substrate is made of glass, polycarbonate, polymethylmethacrylate or amorphous polyolefin.

3. A magnetic recording and reproducing apparatus according to claim 1 or 2, wherein the second light beam comprises two discrete light beams to radiate light onto respective tracks on both sides of the recording track.

4. A magnetic recording and reproducing apparatus according to claim 1 or 2, wherein the first and second light beams are lasers.

* * * * *